Patented Jan. 25, 1927.

1,615,659

UNITED STATES PATENT OFFICE.

PHILIPP SIEDLER, OF GRIESHEIM-ON-THE-MAIN, GERMANY, ASSIGNOR TO I. G. FARBENINDUSTRIE AKTIENGESELLSCHAFT, OF FRANKFORT-ON-THE-MAIN, GERMANY.

MANUFACTURE OF CARBON DISULPHIDE.

No Drawing. Origir application filed June 29, 1925, Serial No. 40,386, and in Germany July 3, 1924. Divided and this application filed November 28, 1925. Serial No. 72,041.

This invention relates to the manufacture of carbon disulphide $CS_2$, more especially to the method of charging the furnaces with charcoal, and stands in relation to the invention described in my copending application Serial No. 40,386, filed June 29, 1925, from which this application has been divided out.

It is well known that the output in the production of carbon disulphide essentially depends on the quantity of moisture entering the heating zone, owing to the fact that the presence of water would result in the formation of carbon monoxid, carbon dioxid and sulphuretted hydrogen, the latter, in particular, involving a loss of sulphur.

Hitherto in practice nothing better was known than to remove the adsorbed water from the charcoal (or other sort of porous coal) by preliminary drying, with or without the application of vacuum, or, in some cases, by gently preheating the charcoal or the like in the upper parts of the shaft of the furnace itself or in a separate container and drawing off, with the carbon disulphide, the gases and water vapours produced, which latter react with the carbon disulphide to form sulphuretted hydrogen. Consequently one was obliged to separate, in a peculiar washing plant, from the big quantity of waste gases the carbon disulphide contained therein and to provide for a sulphur regenerating plant (system of Claus-Chance or the like), whereby a great expense for attendance and heating materials was necessitated.

Now I have recognized that by removing the adsorbed water, or by moderate heating to red-heat the best conditions for attaining the maximum output of carbon disulphide and avoiding the undesired formation of sulphretted hydrogen, are by no means attained; and that the most favorable conditions are only realizable when also the latent source of formation of steam and other noxious gases (or gases, the formation of which is connected with the consumption of sulphur) is removed. As such source I consider the presence of fixed oxygen and hydrogen in the charcoal, originating from the cellulose or lignin molecules of the wood. From the fact that common marketable charcoal, by heating the same up to 1000° C., loses from 20 to 30 per cent of its weight, it may easily be understood what an important part the available amount of water vapour and gas-forming substances plays.

Therefore my invention consists in feeding the carbon disulphide furnace only with charcoal, which has been practically completely calcined, that is to say, at temperatures from 1000° to 1200° C., and that in such a manner that the charcoal runs in an incendescent state and free from the access of air from a preheating furnace arranged at a corresponding level to the carbon disulphide furnace.

For carrying out my invention I preferably employ an apparatus as follows:— The preheating device is made to form an electric resistance furnace, in which the non-conducting raw charcoal to be calcined is charged above incandescent conductive charcoal. In this furnace, a shaft lined with bricks is formed, in which an upper movable electrode and one or more stationary bottom electrodes are provided. The bottom electrode consists either of a base plate provided with an outlet opening, or it may be in the form of single electrodes, the ends of which project from the masonry into the interior of the furnace shaft; in both cases the charge of charcoal forms an electric resistance between the upper and the bottom electrode or electrodes.

The outlet opening at the bottom of the preheating furnace is connected with the inlet opening of the carbon disulphide furnace by a pipe which may be closed or opened by usual means if desired, so that the completely calcined charge may be run intermittently into the carbon disulphide furnace without carbon disulphide vapours entering the preheating furnace. The gases produced by the preheating operation may be continuously or intermittently withdrawn from the closed furnace by means of suitable tapping devices. When the carbon disulphide furnace proper is heated by electricity, the preheating of the charcoal in a separate kiln does not entail a noticeable increase of the total amount of electric energy required, as compared with the process hitherto used. However, the little loss merely caused by heat radiation is more than compensated for by the advantages which are connected with the use of completely calcined charcoal.

An apparatus for carrying into practice the present invention is described in my copending application Ser. No. 40,386.

With my improved process, I not only attain an increased output of carbon disulphide, the quantity of waste gases saturated with carbon disulphide being reduced, and at the same time the production of sulphuretted hydrogen being avoided, but also a purer carbon disulphide is produced containing, by far, less sulphuretted hydrogen, fewer organic sulphur compounds and fewer dust particles, for the formation of dust connected with the heating, in this case, no longer takes place in the producer itself. Furthermore the effective power of the producer is increased by the upper layer of charcoal entering the producer at a temperature at which the charcoal immediately participates in conducting the electric current.

My process is especially applicable to furnaces in which the whole charge of the shaft serves as resistance, but also with corresponding adaptation of the apparatus, to all other kinds of shaft or retort furnaces for the production of carbon disulphide.

I claim:—

The process of charging carbon disulphide producers with charcoal, which process consists in calcining the charcoal at temperatures of 1000° C. at least, and then introducing the thus calcined charcoal into the producer whilst preventing the access of air.

In testimony whereof I affix my signature.

PHILIPP SIEDLER.